(12) United States Patent
Lim et al.

(10) Patent No.: US 10,919,254 B2
(45) Date of Patent: Feb. 16, 2021

(54) CURVED COVER PLATE AND CURVED DISPLAY DEVICE AND METHOD OF MANUFACTURING THE SAME

(71) Applicant: LG Display Co., Ltd., Seoul (KR)

(72) Inventors: YuSok Lim, Seoul (KR); Sejun Cho, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/556,953

(22) Filed: Dec. 1, 2014

(65) Prior Publication Data
US 2015/0165720 A1  Jun. 18, 2015

(30) Foreign Application Priority Data
Dec. 16, 2013  (KR) .......................... 10-2013-0156071

(51) Int. Cl.
*B32B 1/00* (2006.01)
*B32B 7/12* (2006.01)
*B32B 3/08* (2006.01)
*G02F 1/1333* (2006.01)

(52) U.S. Cl.
CPC ................ *B32B 1/00* (2013.01); *B32B 3/085* (2013.01); *B32B 7/12* (2013.01); *B32B 2307/41* (2013.01); *B32B 2307/412* (2013.01); *B32B 2457/20* (2013.01); *G02F 2001/133331* (2013.01); *Y10T 156/1043* (2015.01); *Y10T 428/24628* (2015.01)

(58) Field of Classification Search
CPC ....... Y10T 156/1043; Y10T 428/24628; B32B 1/00; B32B 3/085; B32B 7/12; B32B 2307/41; B32B 2307/412; B32B 2457/20
See application file for complete search history.

(56) References Cited

U.S. PATENT DOCUMENTS

| 5,102,706 A * | 4/1992 | Latte ........................ B44C 3/12 156/63 |
| 6,455,819 B1 * | 9/2002 | Pohl ....................... F24C 15/102 219/452.12 |
| 6,729,054 B1 | 5/2004 | VanderTuin |
| 2008/0227507 A1 * | 9/2008 | Joo ...................... H04M 1/0266 455/575.8 |
| 2010/0103138 A1 * | 4/2010 | Huang .................... G06F 3/044 345/174 |

(Continued)

FOREIGN PATENT DOCUMENTS

| CN | 102916033 A | 2/2013 |
| CN | 102956152 A | 3/2013 |

*Primary Examiner* — Michael Zhang
(74) *Attorney, Agent, or Firm* — Dentons US LLP (57) ABSTRACT

Disclosed is a curved cover plate comprising an upper structure, a lateral structure provided at a predetermined angle with respect to the upper structure, and a bending structure formed between the upper structure and the lateral structure and curved with a predetermined curvature, a curved display device using the same, and a method of manufacturing the same, wherein the bending structure, which is curved with the predetermined curvature, is formed between the upper structure and the lateral structure so that it helps to change the curvature of the curved cover plate by changing the curvature of the bending structure, and also enables realization of various shapes of product by adjusting the position of the bending structure.

6 Claims, 9 Drawing Sheets

(56) References Cited

U.S. PATENT DOCUMENTS

| | | | |
|---|---|---|---|
| 2010/0117975 A1* | 5/2010 | Cho | G06F 1/165 |
| | | | 345/173 |
| 2011/0261002 A1* | 10/2011 | Verthein | G06F 1/181 |
| | | | 345/174 |
| 2012/0114901 A1* | 5/2012 | Uraji | B32B 1/00 |
| | | | 428/121 |
| 2012/0186119 A1 | 7/2012 | Pitcher et al. | |
| 2012/0243151 A1* | 9/2012 | Lynch | H04M 1/0202 |
| | | | 361/679.01 |
| 2012/0327527 A1* | 12/2012 | Jarvis | G09B 9/32 |
| | | | 359/858 |
| 2013/0002133 A1* | 1/2013 | Jin | H01L 51/524 |
| | | | 313/511 |
| 2013/0034685 A1* | 2/2013 | An | H01L 51/524 |
| | | | 428/121 |
| 2013/0071601 A1* | 3/2013 | Bibl | B32B 3/02 |
| | | | 428/67 |
| 2013/0188366 A1* | 7/2013 | Russell-Clarke | C03B 23/245 |
| | | | 362/362 |
| 2013/0323444 A1* | 12/2013 | Ehemann | C03C 21/002 |
| | | | 428/34.4 |
| 2013/0329346 A1* | 12/2013 | Dannoux | C03B 23/0235 |
| | | | 361/679.01 |
| 2014/0133076 A1 | 5/2014 | Verschoor et al. | |
| 2016/0378143 A1* | 12/2016 | Reiman | G06F 3/039 |
| | | | 428/702 |

\* cited by examiner

CURVED COVER PLATE AND CURVED DISPLAY DEVICE AND METHOD OF MANUFACTURING THE SAME

CROSS REFERENCE TO RELATED APPLICATIONS

This application claims the benefit of the Korean Patent Application No. 10-2013-0156071 filed on Dec. 16, 2013, which is hereby incorporated by reference for all purposes as if fully set forth herein.

BACKGROUND OF THE INVENTION

Field of the Invention

Embodiments of the present invention relate to a curved display device. More particularly, the present invention relates to a curved cover plate attached to a front surface of a curved display panel.

Discussion of the Related Art

A flexible display device is a rollable or windable device, which is paperlike, whereby the flexible display device enables easy keeping and good portability. Owing to these advantages, the flexible display device has been steadily studied and developed as a next-generation display device.

Up to now, a rollable display device is not used widely due to some limitations. However, a curved display device, which is curved with a predetermined curvature, has been used.

Figure 1:
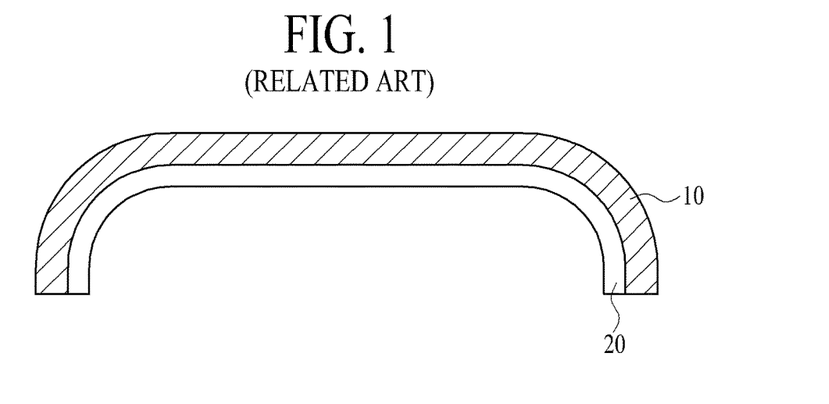
FIG. 1 is a cross sectional view illustrating a related art curved display device.

FIG. 1 is a cross sectional view illustrating a related art curved display device. As shown in FIG. 1, the related art curved display device may include a display panel 20 and a cover plate 10.

The display panel 20 is curved with a predetermined curvature. The curved display panel 20 may be applied to various kinds of display panels generally known to those in the art, for example, liquid crystal display panel, organic light emitting display panel, plasma display panel, and etc.

The cover plate 10 is attached to a front surface of the curved display panel 20, wherein the cover plate 10 enhances a mechanical strength of the display device, and also prevents a scratch on a surface of the curved display panel 20. The cover plate 10 is curved with a predetermined curvature corresponding to the curvature of the display panel 20.

The curved display panel or curved cover plate described in this specification is not limited to the entirely-curved display panel or cover plate. That is, the curved display panel or curved cover plate described in this specification may include the partially-curved display panel or cover plate, or the display panel or cover plate including a bending region.

The curved cover plate 10 is generally formed of glass. In detail, the curved cover plate 10 may be manufactured by a thermal press molding process or vacuum molding process.

Figure 2A:
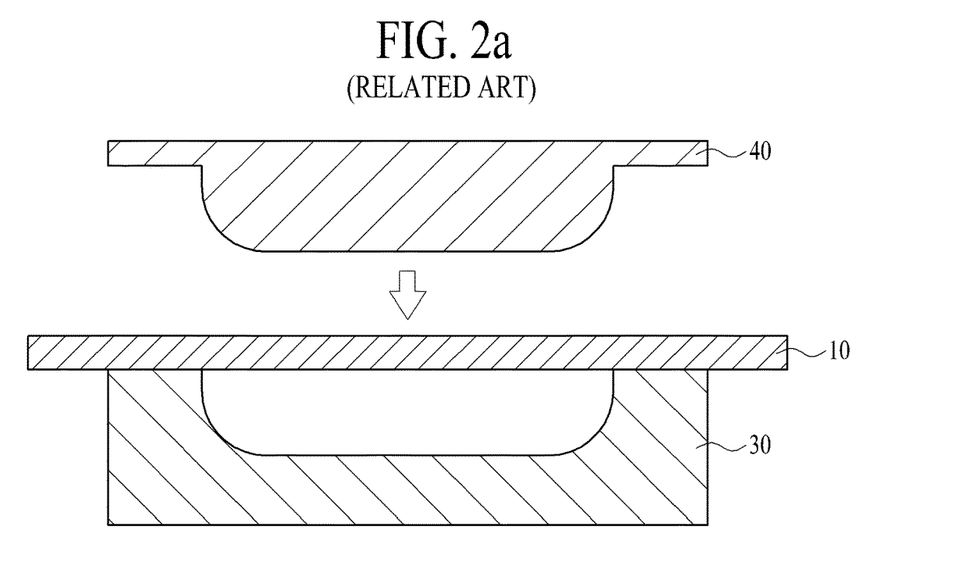
FIGS. 2A and 2B illustrate a method of manufacturing the cover plate according to various examples of the related art.
Figure 2B:
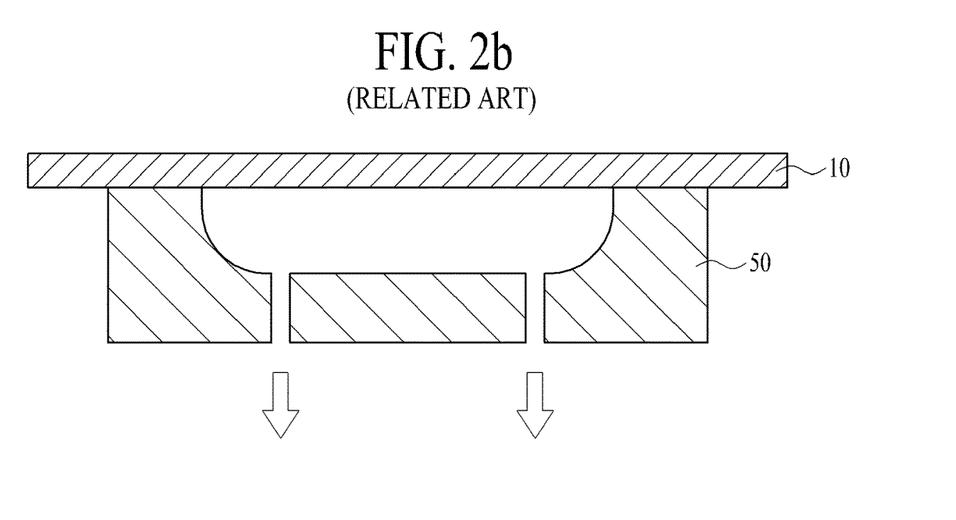

FIGS. 2A and 2B illustrates a method of manufacturing the cover plate according to various examples of the related art, wherein FIG. 2A illustrates the thermal press molding process, and FIG. 2B illustrates the vacuum molding process.

First, in case of the thermal press molding process, as shown in FIG. 2A, the cover plate 10 is placed onto a supporter 30 with a groove corresponding to a curved-surface receiving portion, and then the cover plate 10 is pressed by a mold 40 with a protrusion corresponding to a curved-surface pressing portion at a high temperature, to thereby manufacture the curved cover plate 10.

In case of the vacuum molding process, as shown in FIG. 2B, a vacuum suction is applied while the cover plate 10 is placed onto a chamber 50 with a curved-shape groove, whereby the cover plate 10 is adhered to an inner surface of the chamber 50, to thereby manufacture the curved cover plate 10.

However, the thermal press molding process and vacuum molding process have limitation on adjustment for radius of curvature due to manufacturing properties. Also, an entire apparatus has to be replaced whenever the radius of curvature is changed. In addition, a design of product which is realized by the thermal press molding process and vacuum molding process is limited.

SUMMARY OF THE INVENTION

Accordingly, embodiments of the present invention are directed to a curved cover plate and a curved display device and a method of manufacturing the same that substantially obviates one or more problems due to limitations and disadvantages of the related art.

An aspect of embodiments of the present invention is directed to provide a curved cover plate which facilitates to adjust a radius of curvature and enables to minimize limitation on design of product, a curved display device using the same, and a method of manufacturing the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a curved cover plate that may include an upper structure; a lateral structure provided at a predetermined angle with respect to the upper structure; and a bending structure formed between the upper structure and the lateral structure and curved with a predetermined curvature.

In another aspect of embodiments of the present invention, there is provided a curved display device that may include a curved display panel; and a curved cover plate connected with the curved display panel, wherein the curved cover plate comprises an upper structure; a lateral structure provided at a predetermined angle with respect to the upper structure; and a bending structure formed between the upper structure and the lateral structure and curved with a predetermined curvature.

In another aspect of embodiments of the present invention, there is provided a method of manufacturing a curved display device that may include preparing a flat display panel; forming an adhesive layer on one surface of the display panel; placing an upper structure in a first stage, and placing a lateral structure in a second stage provided at one side of the first stage; contacting the adhesive layer formed on one surface of the display panel with the upper structure and lateral structure; forming a bending region between the upper structure and the lateral structure by rotating the second stage; and adhering a bending structure to the adhesive layer exposed through the bending region.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

On explanation about the embodiments of the present invention, the following details about the terms should be understood.

If using the term such as "the first" or "the second", it does not means the order of corresponding elements, that is, it is to separate any one element from other elements.

Hereinafter, a curved cover plate according to the present invention and a curved display device according to the present invention and a method of manufacturing the same will be described with reference to the accompanying drawings.

Figure 3:
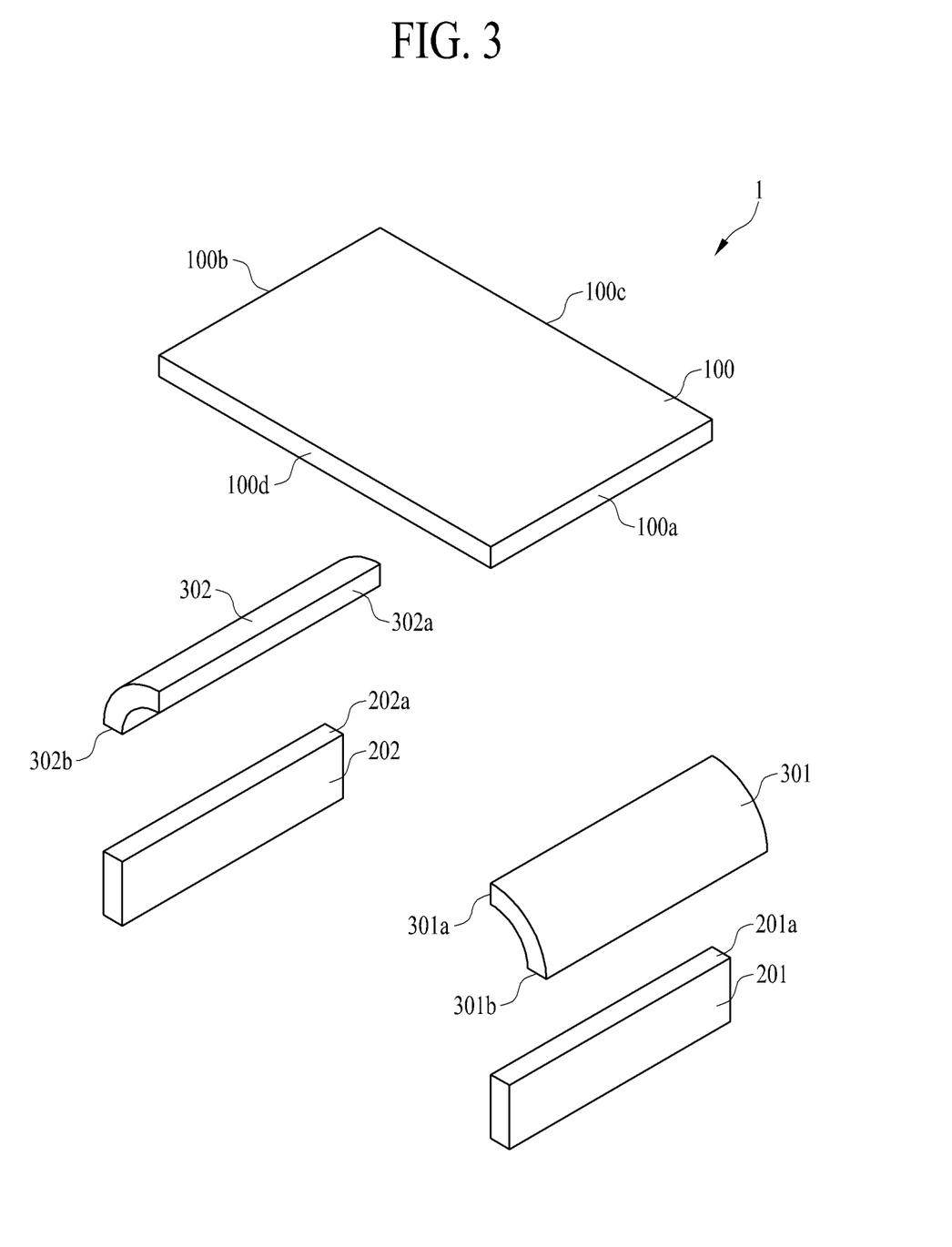
FIG. 3 is an exploded perspective view illustrating a curved cover plate according to one embodiment of the present invention.

FIG. 3 is an exploded perspective view illustrating a curved cover plate according to one embodiment of the present invention.

As shown in FIG. 3, the curved cover plate 1 according to one embodiment of the present invention may include an upper structure 100, lateral structures 201 and 202, and bending structures 301 and 302.

The upper structure 100 corresponds to an upper surface of the curved plate 1. The upper structure 100 may be formed in a flat plate structure.

The upper structure 100 may be formed in a quadrilateral including a first side 100a, a second side 100b, a third side 100c, and a fourth side 100d. The first side 100a corresponds to one side of the upper structure 100, for example, a right side, and the second side 100b corresponds to the other side of the upper structure 100, for example, a left side, wherein the first side 100a and the second side 100b are opposite to each other. Also, the third side 100c corresponds to one side of the upper structure 100, for example, an upper side, and the fourth side 100d corresponds to the other side of the upper structure 100, for example, a lower side, wherein the third side 100c and the fourth side 100d are opposite to each other. In this case, the first and second sides 100a and 100b are short sides, and the third and fourth sides 100c and 100d are long sides, but not necessarily.

The upper structure 100 is formed of a transparent material since the upper structure 100 is a display area on which an image is displayed. For example, the upper structure 100 is formed of glass, but not limited to this material. The upper structure 100 may be formed of transparent plastic.

The lateral structures 201 and 202 correspond to lateral sides of the curved cover plate 1. The lateral structures 201 and 202 may be provided to be vertical to the upper structure 100, but not limited to this arrangement. For example, an angle between the upper structure 100 and the lateral structure 201 and 202 may be changed based on a curvature of the bending structure 301 and 302.

The lateral structures 201 and 202 may be formed in a flat plate structure. Especially, in the same manner as the upper structure 100, each of the lateral structures 201 and 202 may be formed in a quadrilateral. However, an area of each lateral structure 201 and 202 is smaller than an area of the upper structure 100.

The lateral structures 201 and 202 may include the first lateral structure 201 and second lateral structure 202.

The first lateral structure 201 includes a first side 201a corresponding to a long side, wherein the first side 201a of the first lateral structure 201 corresponds to the first side 100a of the upper structure 100.

The second lateral structure 202 includes a first side 202a corresponding to a long side, wherein the first side 202a of the second lateral structure 202 corresponds to the second side 100b of the upper structure 100.

The lateral structures 201 and 202 may correspond to the display area for displaying an image. Thus, the lateral structures 201 and 202 may be formed of a transparent material, for example, glass or transparent plastic. However, it is not limited to these materials. For example, the lateral structures 201 and 202 may correspond to a non-display area on which an image is not displayed. In this case, the lateral structures 201 and 202 may be formed of an opaque material.

The bending structures 301 and 302 are formed between the upper structure 100 and the lateral structures 201 and

202. The bending structures 301 and 302 are connected with the upper structure 100 and the lateral structures 201 and 202.

Each of the bending structures 301 and 302 is curved with a predetermined curvature. Thus, the curved cover plate 1 is formed by the bending structures 301 and 302. The curvature of the bending structure 301 and 302 may be changed based on a curvature of the display panel.

The bending structures 301 and 302 may include the first bending structure 301 and second bending structure 302.

The first bending structure 301 may include a first side 301a and a second side 301b, wherein the first side 301a and the second side 301b being opposite to each other correspond to long sides. The first side 301a of the first bending structure 301 is connected with the first side 100a of the upper structure 100, and the second side 301b of the first bending structure 301 is connected with the first side 201a of the first lateral structure 201.

The second bending structure 302 may include a first side 302a and a second side 302b, wherein the first side 302a and the second side 302b being opposite to each other correspond to long sides. The first side 302a of the second bending structure 302 is connected with the second side 100b of the upper structure 100, and the second side 302b of the second bending structure 302 is connected with the first side 202a of the second lateral structure 202.

The bending structures 301 and 302 may correspond to the display area for displaying an image. In this case, the bending structures 301 and 302 may be formed of a transparent material, for example, glass or transparent plastic. However, it is not limited to these materials. For example, the bending structures 301 and 302 may correspond to the non-display area on which an image is not displayed. In this case, the bending structures 301 and 302 may be formed of an opaque material.

Meanwhile, it is possible to remove the first lateral structure 201 and the first bending structure 301 from the aforementioned curved cover plate of FIG. 3, or to remove the second lateral structure 202 and the second bending structure 302 from the aforementioned curved cover plate of FIG. 3.

Figure 4:
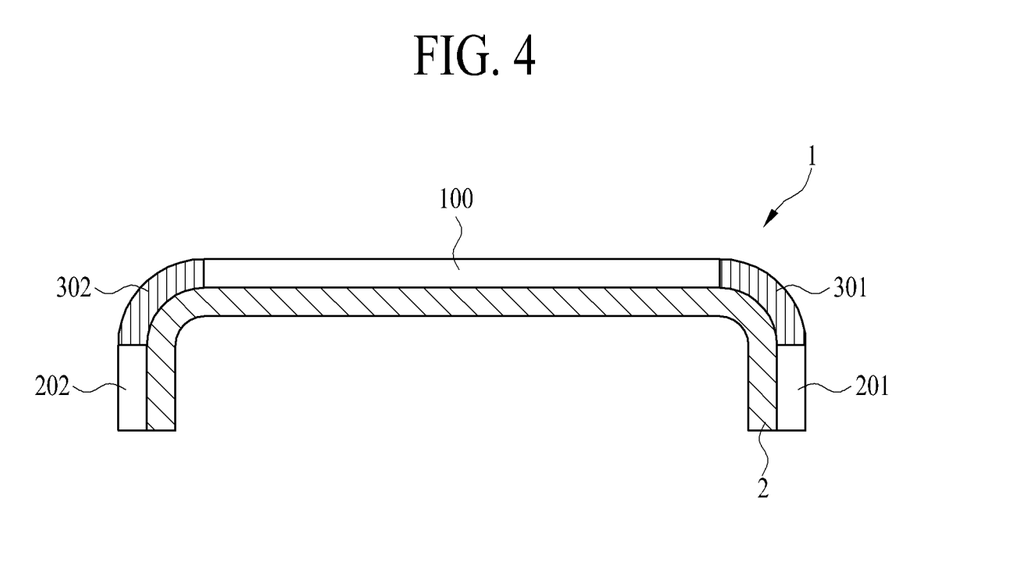
FIG. 4 is a cross sectional view illustrating a curved display device with the curved cover plate according to one embodiment of the present invention.

FIG. 4 is a cross sectional view illustrating a curved display device with the curved cover plate according to one embodiment of the present invention.

As shown in FIG. 4, the curved display device according to one embodiment of the present invention may include the curved cover plate 1 and a curved display panel 2.

The curved cover plate 1 may include the above upper structure 100, lateral structures 201 and 202, and bending structures 301 and 302 which are shown in FIG. 3.

The curved display panel 2 is formed in a structure corresponding to the curved cover plate 1. That is, the curved display panel 2 is curved with a predetermined curvature in a region corresponding to the bending structures 301 and 302. The curved display panel 2 may be used for various panels generally known to those in the art, for example, liquid crystal display panel or organic light emitting display panel.

The curved cover plate 1 may be connected with the curved display panel 2. That is, the upper structure 100, lateral structures 201 and 202 and bending structures 301 and 302 may be connected with the curved display panel 2 through the use of adhesive layer such as adhesive resin or both-sided adhesive film by a connection method generally known to those in the art.

Also, the bending structure 301 and 302 may be connected with the upper structure 100, and the bending structure 301 and 302 may be connected with the lateral structure 201 and 202, but not necessarily.

For the following various embodiments to be described, the respective elements included in the curved cover plate 1 may be connected with the curved display panel 2. Also, the respective elements included in the curved cover plate 1 may be connected with one another.

Figure 5:
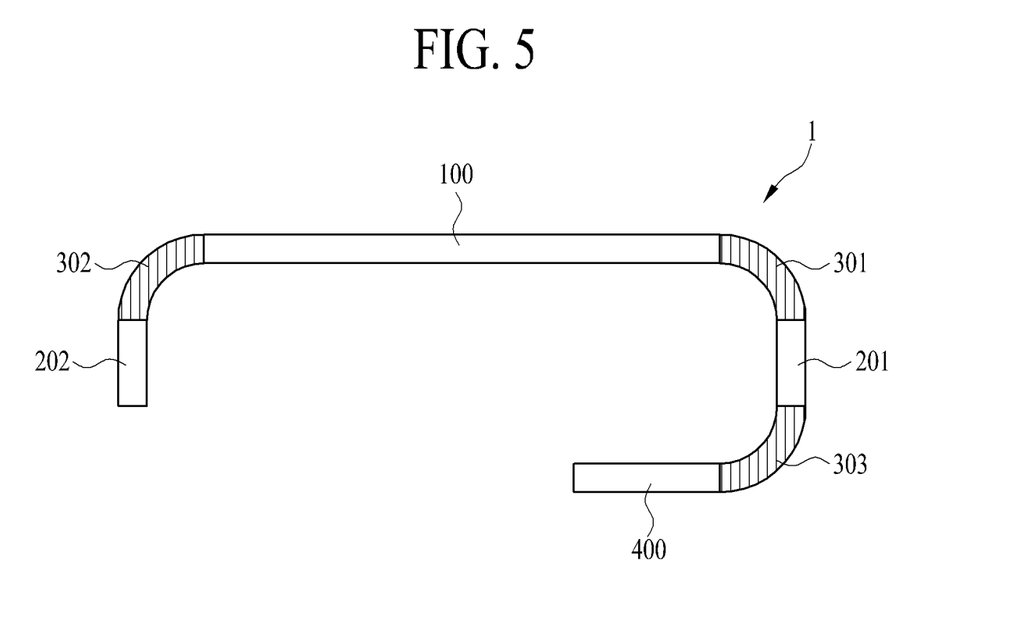
FIG. 5 is a cross sectional view illustrating a curved cover plate according to another embodiment of the present invention.

FIG. 5 is a cross sectional view illustrating a curved cover plate according to another embodiment of the present invention.

As shown in FIG. 5, the curved cover plate 1 according to another embodiment of the present invention may include an upper structure 100, lateral structures 201 and 202, a lower structure 400, and bending structures 301, 302 and 303.

The upper structure 100 and the lateral structures 201 and 202 are the same as those of FIGS. 3 and 4, whereby a detailed description for the upper structure 100 and the lateral structures 201 and 202 will be omitted.

The lower structure 400 corresponds to a lower surface of the curved cover plate 1. The lower structure 400 may be arranged in parallel to the upper structure 100 while being provided at a predetermined angle with respect to the lateral structure 201 and 202, but not limited to this arrangement.

The lower structure 400 may be formed in a flat plate structure. In the same manner as the upper structure 100, the lower structure 400 may be formed in a quadrilateral.

The lower structure 400 may correspond to the display area on which an image is displayed. Thus, the lower structure 400 may be formed of a transparent material, for example, glass or transparent plastic. However, it is not limited to these materials.

The bending structures 301, 302 and 303 may include the first bending structure 301, second bending structure 302 and third bending structure 303.

The first and second bending structures 301 and 302 are the same as those of FIGS. 3 and 4, whereby a detailed description for the first and second bending structures 301 and 302 will be omitted.

The third bending structure 303 is formed between the lower structure 400 and the first lateral structure 201. The third bending structure 303 is connected with the lower structure 400 and the first lateral structure 201. Although not shown, the third bending structure 303 may be formed between the lower bending structure 400 and the second lateral structure 202.

The third bending structure 303 is curved with a predetermined curvature. The curvature of the third bending structure 300 may be the same as the curvature of each of the first and second bending structures 301 and 302, but not necessarily. An angle between the lower structure 400 and the first lateral structure 201 may be adjusted according to the curvature of the third bending structure 303.

The third bending structure 303 may correspond to the display area on which an image is displayed. In this case, the third bending structure 303 may be formed of a transparent material, for example glass or transparent plastic. However, it is not limited to these materials. For example, the third bending structure 303 may correspond to the non-display area on which an image is not displayed. In this case, the third bending structure 303 may be formed of an opaque material.

Figure 6:
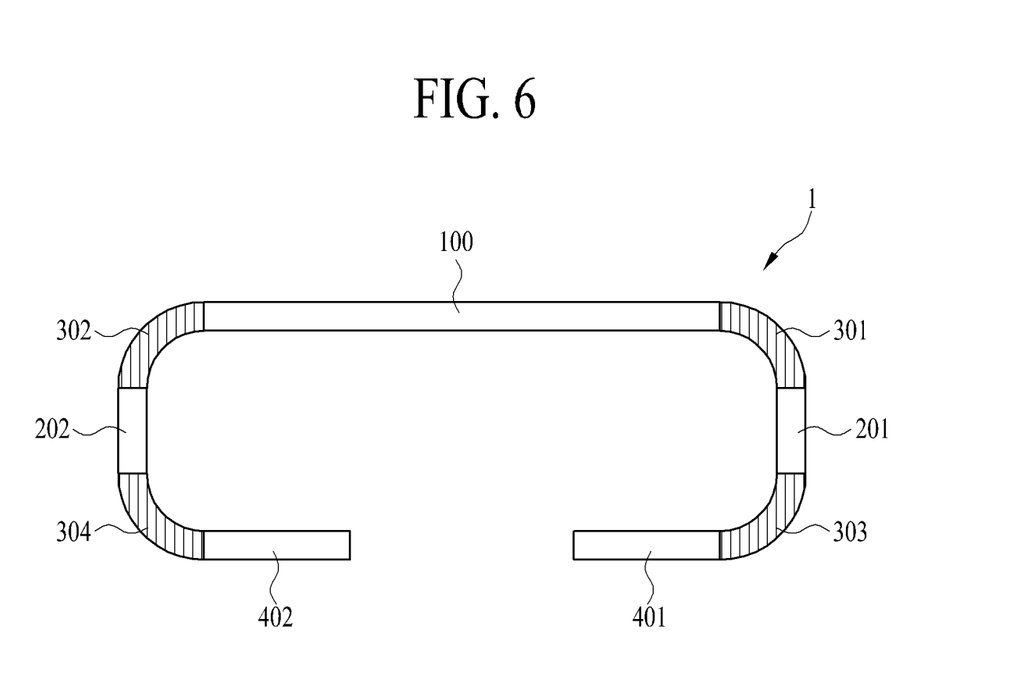
FIG. 6 is a cross sectional view illustrating a curved cover plate according to another embodiment of the present invention.

FIG. 6 is a cross sectional view illustrating a curved cover plate according to another embodiment of the present invention.

As shown in FIG. 6, the curved cover plate 1 according to another embodiment of the present invention may include an upper structure 100, lateral structures 201 and 202, lower structures 401 and 402, and bending structures 301, 302, 303 and 304.

The upper structure 100 and the lateral structures 201 and 202 are the same as those of FIGS. 3 and 4, whereby a detailed description for the upper structure 100 and the lateral structures 201 and 202 will be omitted.

The lower structures 401 and 402 correspond to a lower surface of the curved cover plate 1. The lower structures 401 and 402 may be arranged in parallel to the upper structure 100, but not limited to this arrangement. The lower structures 401 and 402 may be formed in a flat plate structure. In the same manner as the upper structure 100, the lower structures 401 and 402 may be formed in a quadrilateral.

The lower structures 401 and 402 may include the first lower structure 401 and second lower structure 402. The first lower structure 401 is connected with the third bending structure 303, and the second lower structure 402 is connected with the fourth bending structure 304.

The lower structures 401 and 402 may correspond to the display area on which an image is displayed. Thus, the lower structures 401 and 402 may be formed of a transparent material, for example glass or transparent plastic. However, it is not limited to these materials.

The bending structures 301, 302, 303 and 304 may include the first bending structure 301, second bending structure 302, third bending structure 303 and fourth bending structure 304.

The first and second bending structures 301 and 302 are the same as those of FIGS. 3 and 4, whereby a detailed description for the first and second bending structures 301 and 302 will be omitted.

The third bending structure 303 is formed between the first lower structure 401 and the first lateral structure 201, and the fourth bending structure 304 is formed between the second lower structure 402 and the second lateral structure 202.

Each of the third and fourth bending structures 303 and 304 is curved with a predetermined curvature. The curvature of each of the third and fourth bending structure 303 and 304 may be the same as the curvature of each of the first and second bending structures 301 and 302, but not necessarily. An angle between the first lower structure 401 and the first lateral structure 201 may be adjusted by the curvature of the third bending structure 303, and an angle between the second lower structure 402 and the second lateral structure 202 may be adjusted by the curvature of the fourth bending structure 304.

The third bending structure 303 and fourth bending structure 304 may correspond to the display area on which an image is displayed. In this case, the third bending structure 303 and fourth bending structure 304 may be formed of a transparent material, for example glass or transparent plastic. However, it is not limited to these materials.

Figure 7:
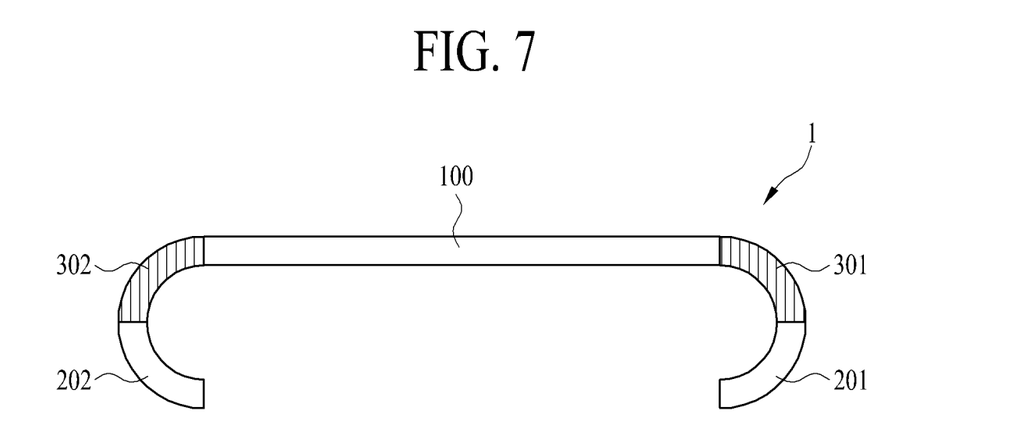
FIG. 7 is a cross sectional view illustrating a curved cover plate according to another embodiment of the present invention.

FIG. 7 is a cross sectional view illustrating a curved cover plate according to another embodiment of the present invention.

As shown in FIG. 7, the curved cover plate 1 according to another embodiment of the present invention may include an upper structure 100, lateral structures 201 and 202, and bending structures 301 and 302.

The upper structure 100 and the bending structures 301 and 302 are the same as those of FIGS. 3 and 4, whereby a detailed description for the upper structure 100 and the bending structures 301 and 302 will be omitted.

The lateral structures 201 and 202 may include the first lateral structure 201 and second lateral structure 202.

Each of the first and second lateral structures 201 and 202 may be formed in a curved structure.

The first lateral structure 201 and second lateral structure 202 may be formed of a transparent material such as glass or transparent plastic. If needed, the first lateral structure 201 and second lateral structure 202 may be formed of an opaque material.

Figure 8:
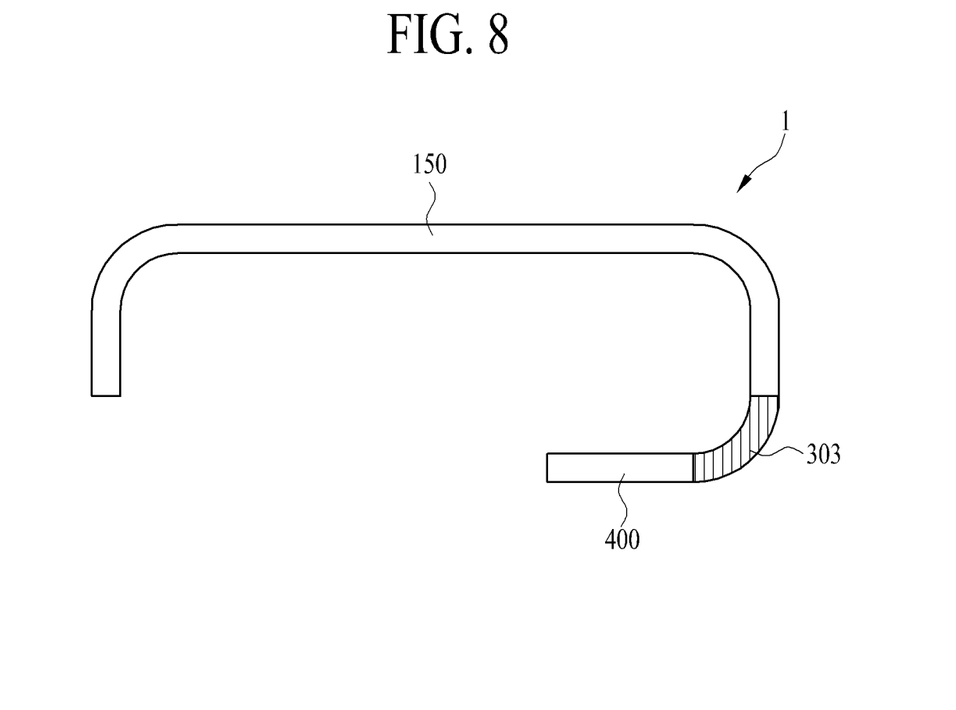
FIG. 8 is a cross sectional view illustrating a curved cover plate according to another embodiment of the present invention.

FIG. 8 is a cross sectional view illustrating a curved cover plate according to another embodiment of the present invention.

As shown in FIG. 8, the curved cover plate 1 according to another embodiment of the present invention may include a unified upper-lateral structure 150, a lower structure 400, and a third bending structure 303.

The unified upper-lateral structure 150 may be obtained by unifying the upper structure 100, lateral structures 201 and 202 and bending structures 301 and 302, which are shown in FIGS. 3 and 4, as one body. The unified upper-lateral structure 150 may be formed of a transparent material such as glass or transparent plastic.

The lower structure 400 may be arranged in parallel to an upper surface of the unified upper-lateral structure 150, but not necessarily. A detailed structure of the lower structure 400 is the same as that of the lower structure 400 shown in FIG. 5, whereby a detailed description for the lower structure 400 will be omitted.

A detailed structure of the third bending structure 303 is the same as that of the third bending structure 303 shown in FIG. 5, whereby a detailed description for the third bending structure 303 will be omitted.

Figure 9:
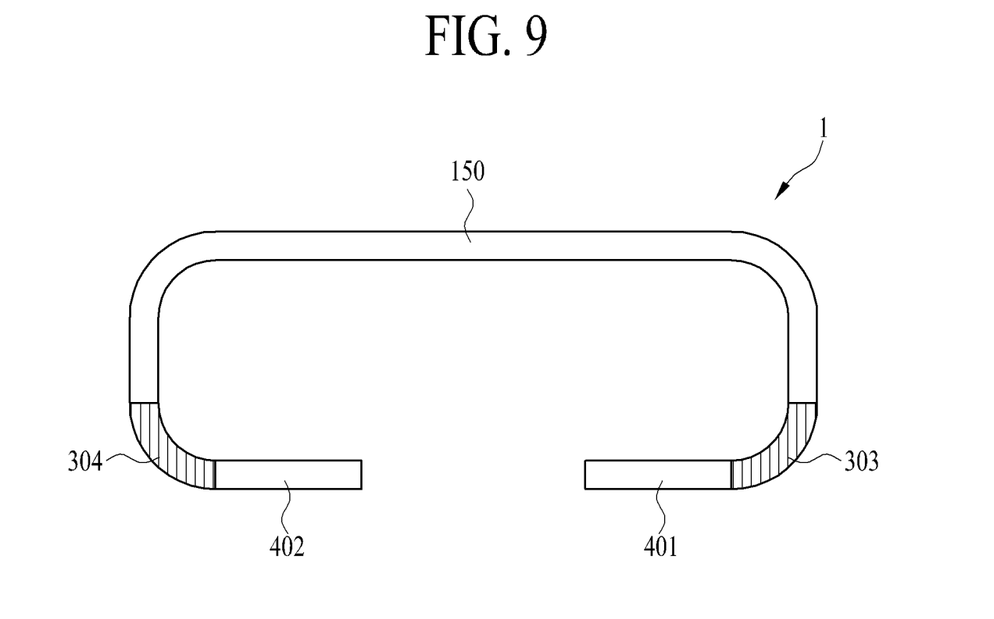
FIG. 9 is a cross sectional view illustrating a curved cover plate according to another embodiment of the present invention.

FIG. 9 is a cross sectional view illustrating a curved cover plate according to another embodiment of the present invention.

As shown in FIG. 9, the curved cover plate 1 according to another embodiment of the present invention may include a unified upper-lateral structure 150, a first lower structure 401, a second lower structure 402, a third bending structure 303, and a fourth bending structure 304.

The unified upper-lateral structure 150 of FIG. 9 is the same as the unified upper-lateral structure 150 of FIG. 8.

The first lower structure 401 and second lower structure 402 may be provided in parallel to an upper surface of the unified upper-lateral structure 150, but not necessarily. A detailed structure of the first lower structure 401 and second lower structure 402 is the same as that of the first lower structure 401 and second lower structure 402 shown in FIG. 6, whereby a detailed description for the first lower structure 401 and second lower structure 402 will be omitted.

A detailed structure of the third bending structure 303 and fourth bending structure 304 is the same as that of the third bending structure 303 and fourth bending structure 304 shown in FIG. 6, whereby a detailed description for the third bending structure 303 and fourth bending structure 304 will be omitted.

Figure 10:
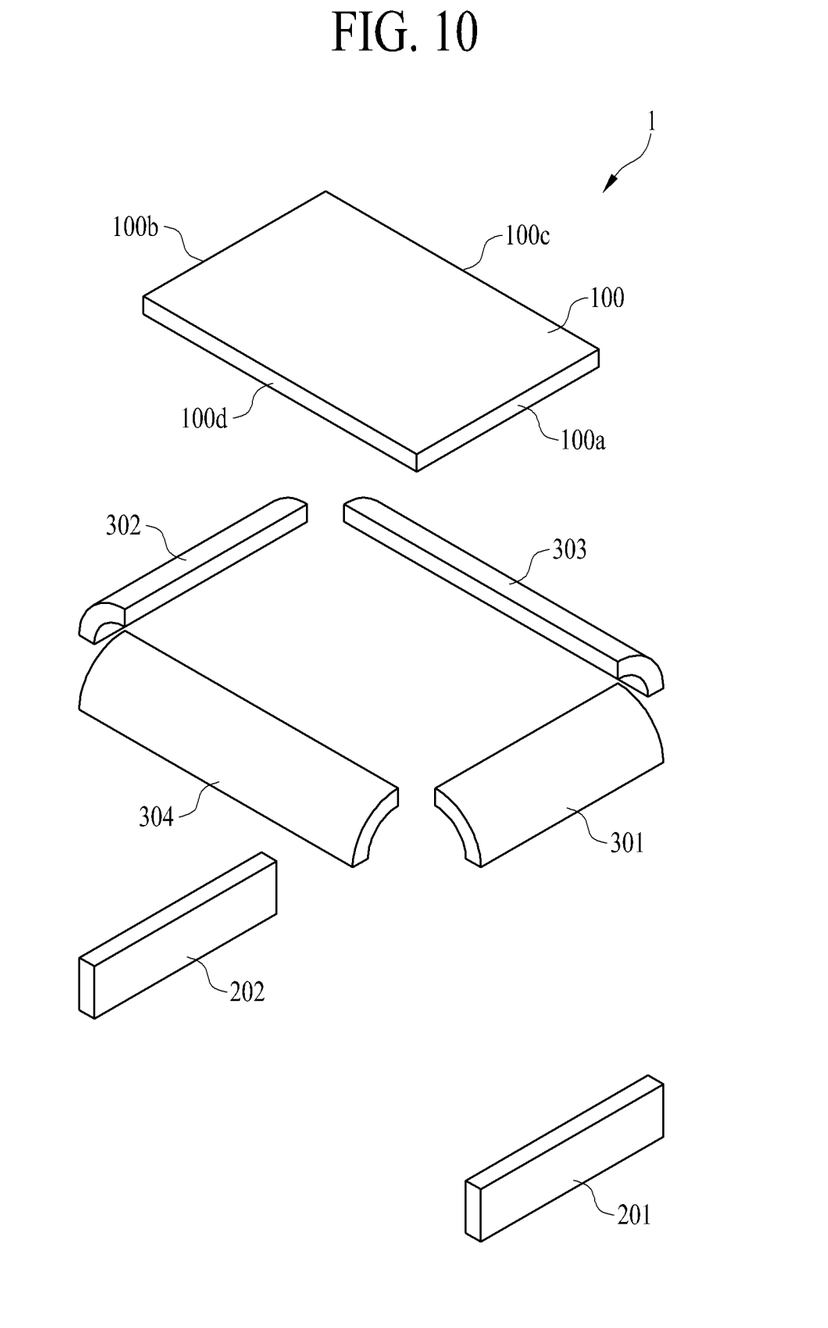
FIG. 10 is an exploded perspective view illustrating a curved cover plate according to another embodiment of the present invention.

FIG. 10 is an exploded perspective view illustrating a curved cover plate according to another embodiment of the present invention.

Except that third and fourth bending structures 304 and 304 are additionally provided, the curved cover plate 1 of FIG. 10 is the same as the curved cover plate 1 of FIG. 3. Thus, wherever possible, the same reference numbers will be used throughout the drawings to refer to the same or like parts, and only different structures will be described in detail.

As shown in FIG. 10, bending structures 301, 302, 303 and 304 may include the first bending structure 301, second bending structure 302, third bending structure 303, and fourth bending structure 304.

The first bending structure 301 is connected with a first side 100a of an upper structure 100, and the second bending structure 302 is connected with a second side 100b of the upper structure 100.

The third bending structure 303 is connected with a third side 100c of the upper structure 100, and the fourth bending structure 304 is connected with a fourth side 100d of the upper structure 100.

Each of the third bending structure 303 and fourth bending structure 304 is curved with a predetermined curvature. The third bending structure 303 and fourth bending structure 304 may be formed of a transparent material such as glass or transparent plastic. If needed, the third bending structure 303 and fourth bending structure 304 may be formed of an opaque material.

The first bending structure 301, second bending structure 302, third bending structure 303 and fourth bending structure 304 may be independently provided as separate elements, or may be unified as one body.

Although not shown, it is possible to be additionally provided a third lateral structure connected with the third bending structure 303, and a fourth lateral structure connected with the fourth bending structure 304. The third lateral structure and fourth lateral structure may be changed in various ways, as shown in the aforementioned lateral structures 201 and 202.

FIGS. 11A to 11D illustrate a method of manufacturing the curved display device according to one embodiment of the present invention.

Figure 11A:
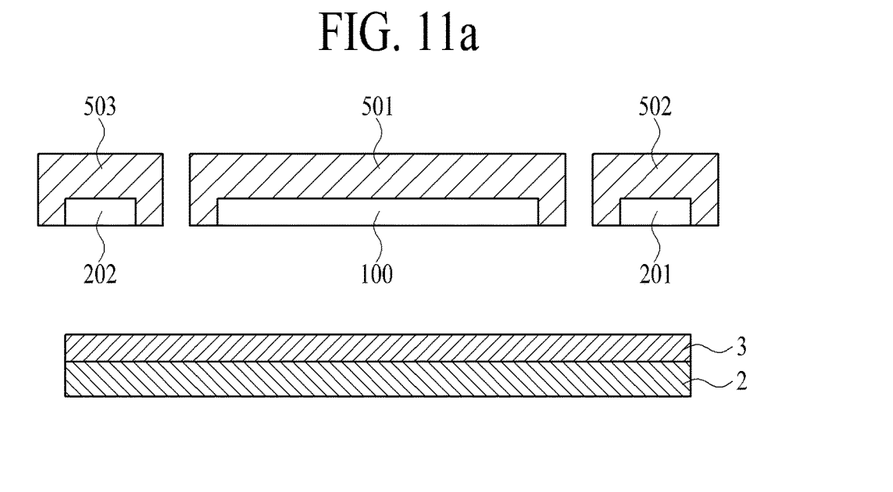
FIGS. 11A to 11D illustrate a method of manufacturing the curved display device according to one embodiment of the present invention.

First, as shown in FIG. 11A, a flat display panel 2 is prepared, and an adhesive layer 3 is formed on one surface of the display panel 2. Then, the upper structure 100 is placed in a first stage 501, the first lateral structure 201 is placed in a second stage 502, and the second lateral structure 202 is placed in a third stage 503.

The display panel 2 may be used for various kinds of panels generally known to those in the art, for example, liquid crystal display panel or organic light emitting display panel. The display panel 2 may be manufactured by the various methods generally known to those in the art.

The adhesive layer 3 may be formed by the use of adhesive resin or both-sided adhesive film.

The first stage 501 is provided with a placing space thereinside. Thus, the upper structure 100 is placed in the placing space of the first stage 501. The upper structure 100 is fixed to the first stage 501 by a vacuum suction method or an electrostatic chucking method generally known to those in the art. The upper structure 100 is placed while being confronted with the adhesive layer 3.

The second stage 502 is provided with a placing space thereinside. Thus, the first lateral structure 201 is placed in the placing space of the second stage 502. The first lateral structure 201 is fixed to the second stage 502 by a vacuum suction method or an electrostatic chucking method generally known to those in the art. The first lateral structure 201 is placed while being confronted with the adhesive layer 3.

The third stage 503 is provided with a placing space thereinside. Thus, the second lateral structure 202 is placed in the placing space of the third stage 503. The second lateral structure 202 is fixed to the third stage 503 by a vacuum suction method or an electrostatic chucking method generally known to those in the art. The second lateral structure 202 is placed while being confronted with the adhesive layer 3.

The second stage 502 is arranged at one side of the first stage 501, and the third stage 503 is arranged at the other side of the first stage 501.

The second stage 502 and the third stage 503 are rotated independently.

Figure 11B:
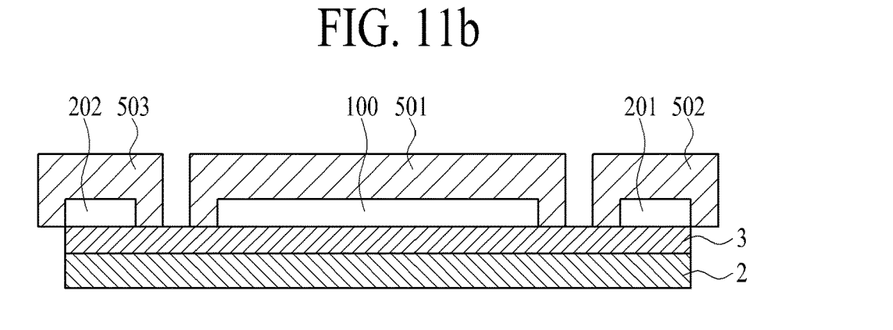

Then, as shown in FIG. 11B, the adhesive layer 3 formed on one surface of the display panel 2 is brought into contact with the upper structure 100, first lateral structure 201 and second lateral structure 202, and is then adhered to the upper structure 100, first lateral structure 201 and second lateral structure 202.

Figure 11C:
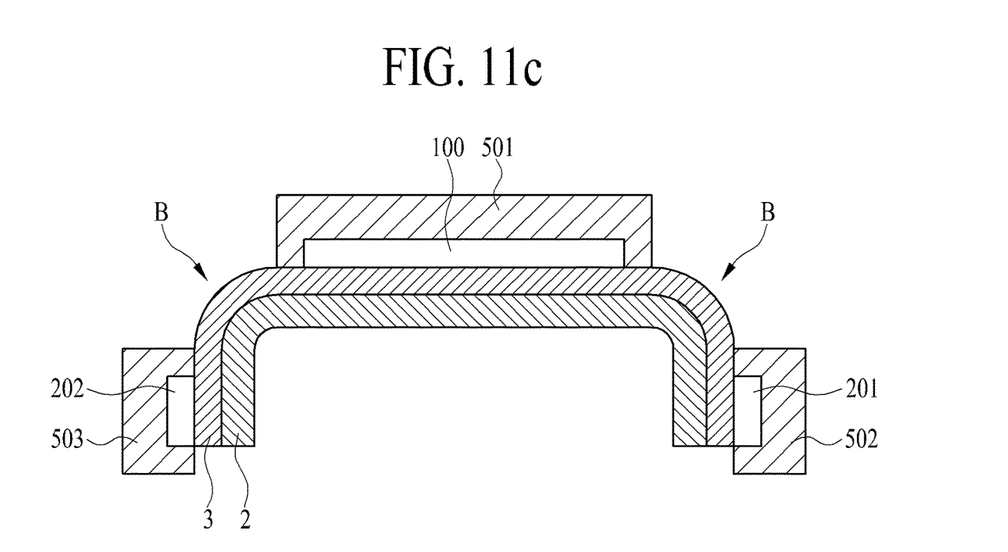

As shown in FIG. 11C, the second stage 502 and third stage 503 are rotated. In detail, the second stage 502 is rotated in a clockwise direction, and the third stage 503 is rotated in a counter clockwise direction.

Accordingly, the first lateral structure 201 placed in the second stage 502 and the second lateral structure 202 placed in the third stage 503 are provided at a predetermined angle with respect to the upper structure 100 placed in the first stage 501, for example, the first lateral structure 201 and second lateral structure 202 are provided perpendicular to the upper structure 100.

Also, a bending region (B) is formed in the display panel 2 and the adhesive layer 3. That is, when the bending region (B) is formed between the upper structure 100 and the first lateral structure 201 and between the upper structure 100 and the second lateral structure 202, the adhesive layer 3 is exposed through the bending region (B).

Figure 11D:
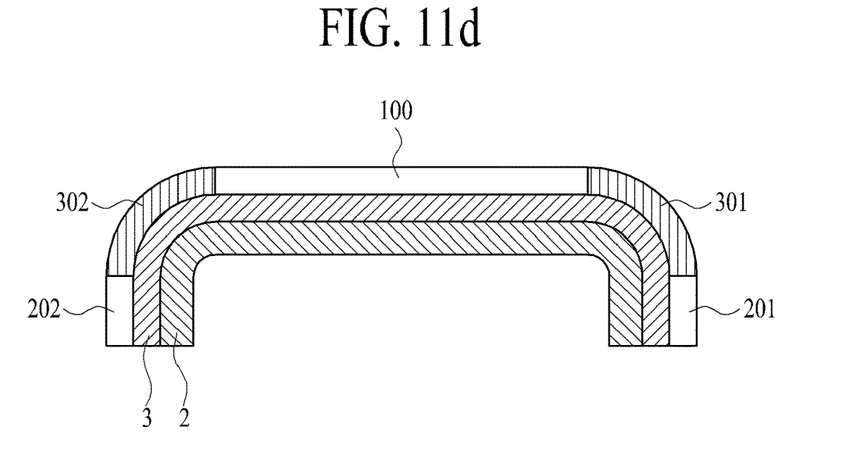

Then, as shown in FIG. 11D, the first bending structure 301 and second bending structure 302 are adhered to the bending region (B), to thereby manufacture the curved display device according to one embodiment of the present invention.

The first bending structure 301 is adhered between the upper structure 100 and the first lateral structure 201, and the second bending structure 302 is adhered between the upper structure 100 and the second lateral structure 202.

FIGS. 12A to 12D illustrate a method of manufacturing the curved display device according to another embodiment of the present invention.

Figure 12A:
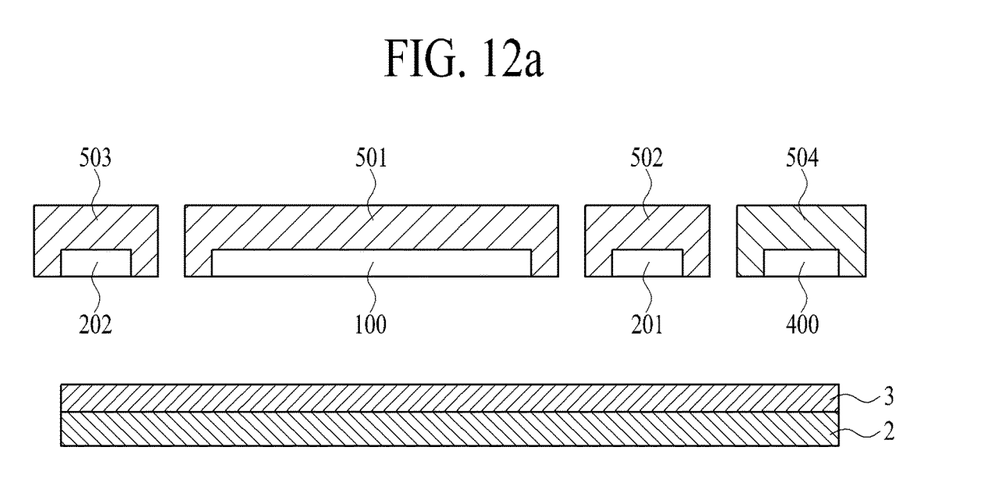
FIGS. 12A to 12D illustrate a method of manufacturing the curved display device according to another embodiment of the present invention.

First, as shown in FIG. 12A, a flat display panel 2 is prepared, and an adhesive layer 3 is formed on one surface of the display panel 2. Then, the upper structure 100 is placed in a first stage 501, the first lateral structure 201 is placed in a second stage 502, the second lateral structure 202 is placed in a third stage 503, and the lower structure 400 is placed in a fourth stage 504.

A process of forming the display panel 2 and adhesive layer 3 is the same as the above process of the curved display device shown in FIGS. 11A to 11D.

A process of placing the upper structure 100, first lateral structure 201 and second lateral structure 202 in the respective first, second and third stages 501, 502 and 503 is the same as the above process of the curved display device shown in FIGS. 11A to 11D.

The fourth stage 504 is provided with a placing space thereinside. Thus, the lower structure 400 is placed in the placing space of the fourth stage 504. The lower structure 400 is fixed to the fourth stage 504 by a vacuum suction method or an electrostatic chucking method generally known to those in the art. The lower structure 400 is placed while being confronted with the adhesive layer 3.

The second stage 502 is arranged at one side of the first stage 501, the third stage 503 is arranged at the other side of the first stage 501, and the fourth stage 504 is arranged at one side of the second stage 502. The fourth stage 504 may be arranged at one side of the third stage 503.

The second stage 502, third stage 503 and fourth stage 504 may be rotated independently.

Figure 12B:
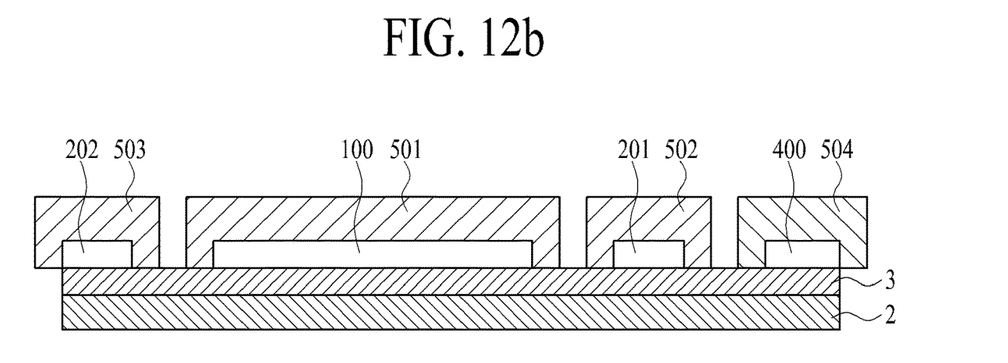

Then, as shown in FIG. 12B, the adhesive layer 3 formed on one surface of the display panel 2 is brought into contact with the upper structure 100, first lateral structure 201, second lateral structure 202 and lower structure 400, and is then adhered to the upper structure 100, first lateral structure 201, second lateral structure 202 and lower structure 400.

Figure 12C:
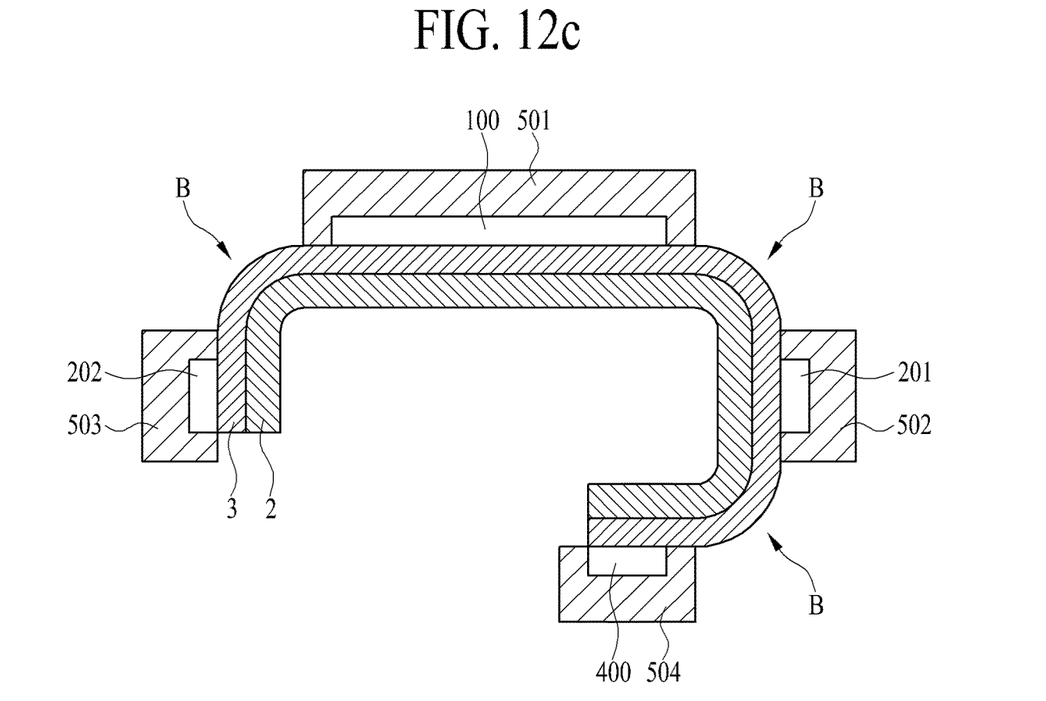

As shown in FIG. 12C, the second stage 502, third stage 503 and fourth stage 504 are rotated. In detail, the second stage 502 is rotated in a clockwise direction, the third stage 503 is rotated in a counter clockwise direction, and the fourth stage 504 is rotated in a clockwise direction.

Accordingly, the first lateral structure 201 placed in the second stage 502 and the second lateral structure 202 placed in the third stage 503 are provided at a predetermined angle with respect to the upper structure 100 placed in the first stage 501, for example, the first lateral structure 201 and second lateral structure 202 are provided perpendicular to the upper structure 100. Also, the lower structure 400 placed in the fourth stage 504 is provided in parallel to the upper structure 100 placed in the first stage 501.

Also, a bending region (B) is formed in the display panel 2 and the adhesive layer 3. That is, when the bending region (B) is formed between the upper structure 100 and the first lateral structure 201, between the upper structure 100 and the second lateral structure 202 and between the first lateral structure 201 and the lower structure 400, the adhesive layer 3 is exposed through the bending region (B).

Figure 12D:
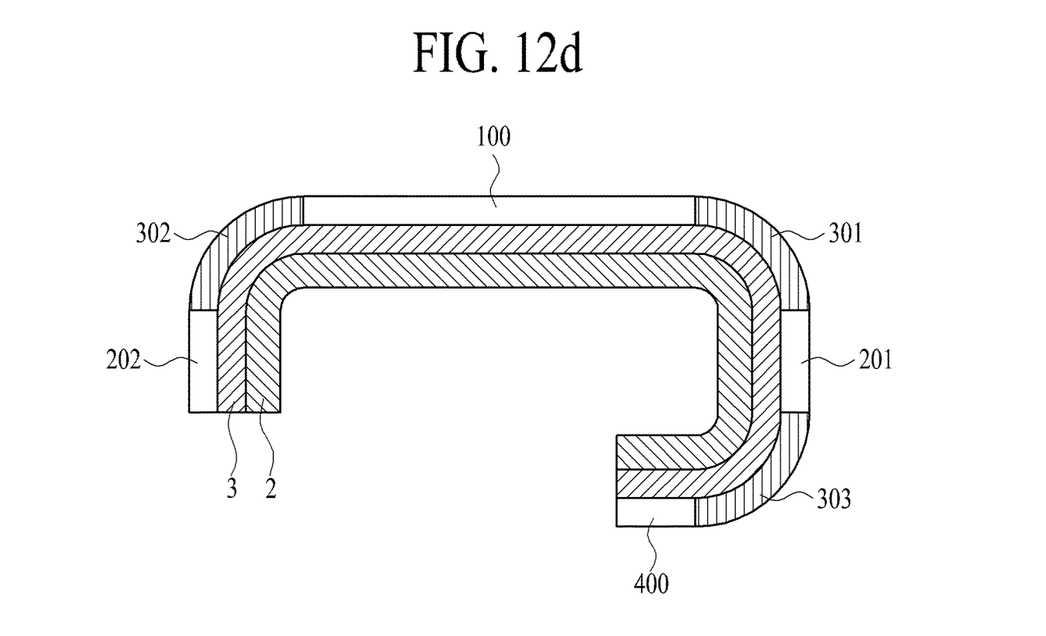

Then, as shown in FIG. 12D, the first bending structure 301, second bending structure 302 and third bending structure 303 are adhered to the bending region (B), to thereby manufacture the curved display device according to another embodiment of the present invention.

The first bending structure 301 is adhered between the upper structure 100 and the first lateral structure 201, the second bending structure 302 is adhered between the upper structure 100 and the second lateral structure 202, and the third bending structure 303 is adhered between the first lateral structure 201 and the lower structure 400.

According to the present invention, the bending structure, which is curved with the predetermined curvature, is formed between the upper structure and the lateral structure so that it facilitates to change the curvature of the curved cover plate by changing the curvature of the bending structure, and also it enables to realize the various shapes of product by adjusting the position of the bending structure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A curved display device comprising:
a curved display panel;
a curved cover plate connected with the curved display panel, and
wherein the curved cover plate comprises:
an upper structure in a flat plate structure, the upper structure being a display area on which an image is displayed;
a lateral structure provided at a predetermined angle with respect to the upper structure;
a bending structure formed between the upper structure and the lateral structure and curved with a predetermined curvature;
one lower structure arranged in parallel to the upper structure and provided at a predetermined angle with respect to the lateral structure; and
one third bending structure provided between the lower structure and the lateral structure and curved with a predetermined curvature, and
wherein the bending structure is positioned adjacent to the upper structure and the lateral structure such that the bending structure is separable from the curved cover plate,
wherein the one third bending structure is positioned adjacent to the lateral structure and the lower structure,
wherein a length of the one lower structure is shorter than a length of the upper structure at any point between an end of the one lower structure adjacent to the one third bending structure and an opposing end of the one lower structure, and an opening adjacent to the one lower structure is provided at the any point to open to an interior space formed by the upper structure, the bending structure, the lateral structure, the one third bending structure, and the lower structure, and
wherein the one lower structure is connected to only the one third bending structure such that the curved cover plate is asymmetric around a central axis of the upper structure.

2. The curved display device according to claim 1, wherein the upper structure includes first and second sides being opposite to each other,
the lateral structure includes a first lateral structure provided with a side corresponding to the first side of the upper structure, and a second lateral structure provided with a side corresponding to the second side of the upper structure, and
the bending structure includes a first bending structure connected between the first side of the upper structure and the side of the first lateral structure, and a second bending structure connected between the second side of the upper structure and the side of the second lateral structure.

3. The curved display device according to claim 1, wherein the upper structure additionally includes third and fourth sides being opposite to each other, and
the bending structure includes a fourth bending structure connected with the third side of the upper structure, and a fifth bending structure connected with the fourth side of the upper structure.

4. The curved display device according to claim 1, wherein the lateral structure is provided in a flat plate structure.

5. The curved display device according to claim 1, wherein the lateral structure is provided in a curved structure.

6. A method of manufacturing a curved display device according to claim 1 comprising:
preparing a flat display panel;
forming an adhesive layer on one surface of the display panel;
placing the upper structure in a first stage;
placing the lateral structure in a second stage provided at one side of the first stage;
placing the lower structure in a third stage provided at one side of the second stage opposite to the first stage;

contacting the adhesive layer formed on the one surface of the display panel with the upper structure, the lateral structure and the lower structure;

forming a first bending region between the upper structure and the lateral structure by rotating the second stage;

forming a second bending region between the lateral structure and the lower structure by rotating the fourth stage; and adhering the bending structure and the third bending structure to the adhesive layer exposed through the first and second bending regions.

* * * * *